May 2, 1961
S. N. LEWIS
2,982,580
TRAILER CHASSIS AND SUB-FLOOR STRUCTURE
Filed Oct. 27, 1958
2 Sheets-Sheet 1
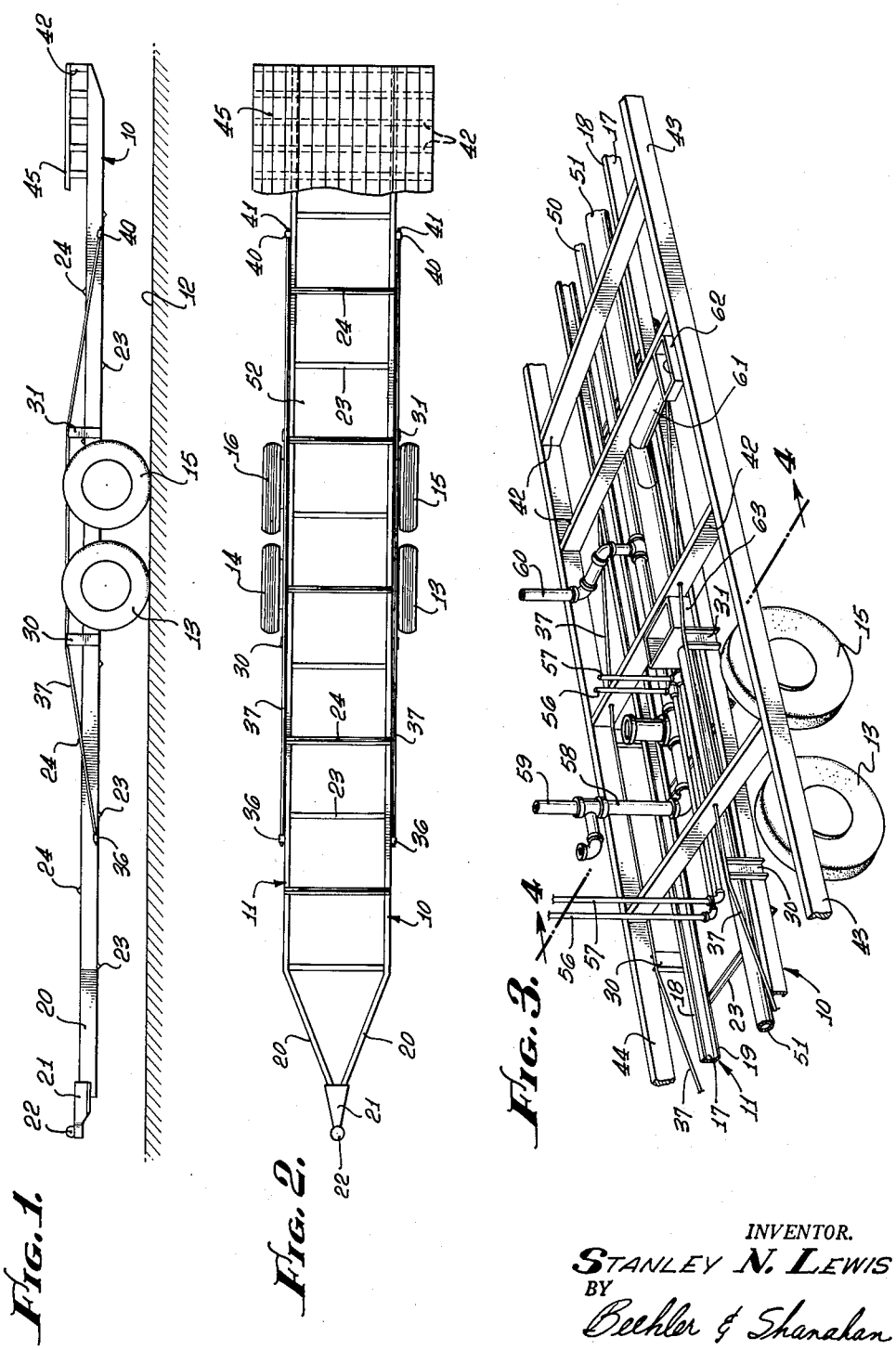
INVENTOR.
STANLEY N. LEWIS
BY
Beehler & Shanahan
ATTORNEYS.

May 2, 1961 S. N. LEWIS 2,982,580
TRAILER CHASSIS AND SUB-FLOOR STRUCTURE
Filed Oct. 27, 1958 2 Sheets-Sheet 2
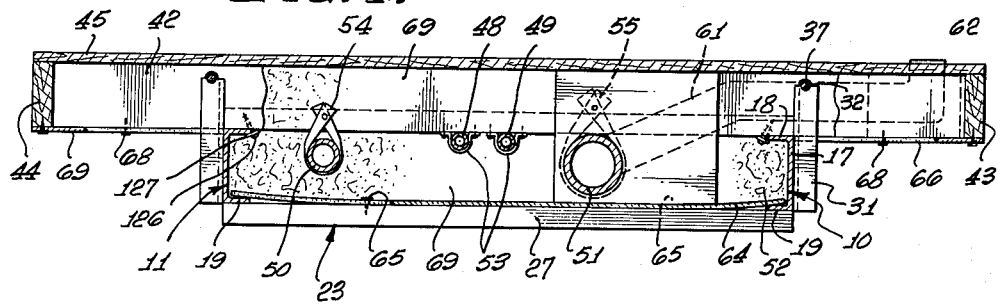
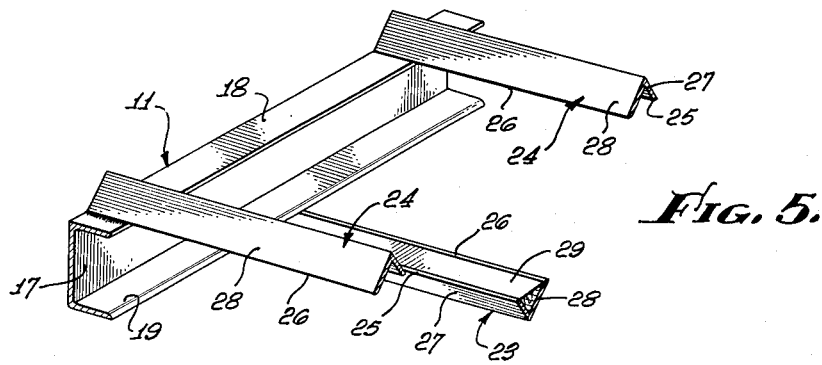
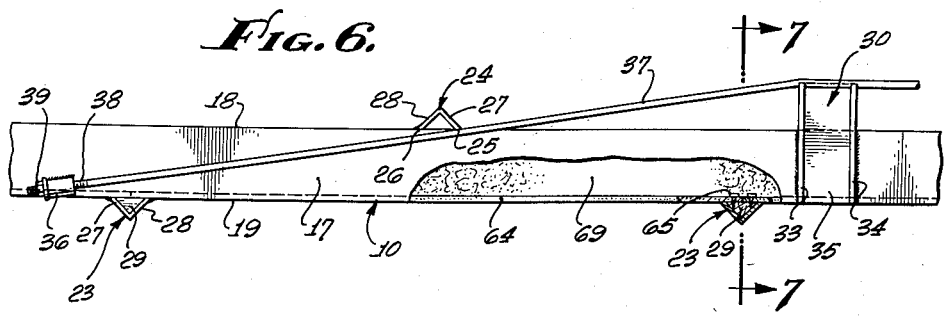
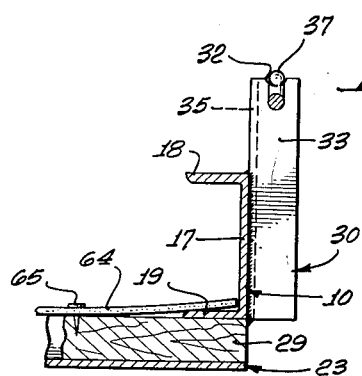
INVENTOR.
STANLEY N. LEWIS
BY
Beehler & Shanahan
ATTORNEYS.

United States Patent Office 2,982,580
Patented May 2, 1961

2,982,580

TRAILER CHASSIS AND SUB-FLOOR STRUCTURE

Stanley N. Lewis, 333 Calle Miramar, Redondo Beach, Calif.

Filed Oct. 27, 1958, Ser. No. 769,605

6 Claims. (Cl. 296—28)

The invention relates to trailers commonly identified as house trailers in that there is built upon a mobile chassis a house-like structure containing customary installations of utilities such as plumbing, water, heating, etc.

More particularly, the invention herein disclosed is directed to a sub-floor and chassis structure for the purpose of simplifying and facilitating the installation and servicing of utilities.

Within the past decade there has been a tremendous impetus and acceleration in the design and construction of house trailers of such considerable size that they are frequently referred to as mobile homes. These are trailers which contain several rooms and are usually complete with kitchen, bath, and toilet facilities as well as containing a heating plant for space heating as well as a heating unit for supplying hot water.

As house trailers and mobile homes grew from one and two room units to units of a greater number of rooms and correspondingly greater length, the chassis and sub-floor structure suitable for small trailer units was merely added to and expanded to provide longer units. The term "longer" is used advisedly in that highway regulations limit to a definite degree the width of trailers which can be drawn over the highways and hence to make larger and more commodious units the increase in size contemplates primarily an increase in length without an increase in width. As longer units were constructed, beams of increasing length became necessary.

The commonly accepted method of building a sub-floor structure in the past has been to provide longitudinal floor joists simulating to a degree the floor joist construction of houses and to brace the longitudinal joists with cross-bracing following conventional building practice. As the need arose for longer and longer joists, the joists had to be made either deeper and heavier or have had to be pieced a number of times to provide sufficient length. The increase in weight due to such heavier sub-floor construction also has caused a demand for a heavier chassis construction and an increasing number of cantilever supports extending from the chassis outwardly in order to provide adequate support for the longitudinal floor joists lying outside the normal confines of the chassis structure.

Further still as the need for plumbing and utility lines increased with the increased length of the trailer, installation of these lines created increasingly difficult problems in that the lines have had to penetrate numerous transverse bracing and blocking in order to lay the lines in the first instance from one end of the trailer to the other and have further necessitated a great deal of cutting through of the critical longitudinal floor joists in order to accommodate outlets for the lines at desired locations. Obviously further when such a considerable amount of cutting is employed for the utility lines, not only has the fabricating cost increased and the structural strength decreased, but the problem of servicing and reconditioning such lines when needed has become almost prohibitive because of their inaccessibility. The location has been such that when changes have become requisite, the trailer has had to be partially taken apart in order to reach the lines.

It is therefore among the objects of the invention to provide a new and improved trailer chassis and sub-floor structure which is considerably improved in strength while at the same time in frequent instances making it possible to decrease to an extent the weight per lineal foot.

Another object of the invention is to provide a new and improved trailer chassis and sub-floor structure so combined that an effective support is provided for the floor without resort to longitudinal floor joists, the structure further enjoying the advantage of enabling installation of numerous utility lines without the necessity of cutting through the floor joists.

Still another object of the invention is to provide a new and improved trailer chassis and sub-floor structure which is quick and inexpensive to assemble and which at the same time is especially economical of material in that less expensive materials can be used without sacrificing the effectiveness of the over-all combination and without it impairing in any degree the firm and rigid character of the over-all structure.

Still another object of the invention is to provide a new and improved trailer chassis and sub-floor structure so designed and constructed that the sub-floor can be perfectly leveled and maintained perfectly level even under conditions where the trailer is especially long and protrudes for a considerable distance fore and aft of the wheeled support.

Still another object of the invention is to provide a new and improved trailer chassis and sub-floor structure which effectively combines elements of the chassis and the sub-floor in a manner permitting quick and thorough installation of insulation material in a fabricating sequence such that the installation of utility lines as well as the insulation and sub-floor structure lends itself especially well to production line technique which results in an advantageous reduction of cost ultimately reflected in the consumer price.

Still further among the objects of the invention is to provide a a stiffening structure for a trailer chassis which by light-weight simple means effectively compensates for the tendency of extra long chassis to flex, especially at the portions intermediate the wheels and the extreme ends whereby the superstructure when built upon the chassis remains tight and plumb during transportation and subsequent use.

With these and other objects in view, the invention consists of the construction, arrangement and combination of the various parts of the device whereby the objects contemplated are attained, as hereinafter set forth, pointed out in the appended claims, and illustrated in the accompanying drawings.

In the drawings:

Figure 1 is a side elevational view of a trailer chassis showing the improved construction wherein a fragment of the sub-floor structure is shown.

Figure 2 is a plan view of the device as illustrated in Figure 1.

Figure 3 is a fragmentary side perspective view of the central portion of the device showing the sub-floor structure in place on the chassis and illustrating the location of utility lines.

Figure 4 is a fragmentary cross-sectional view taken on the line 4—4 of Figure 3.

Figure 5 is a side perspective view illustrating a portion of the chassis construction.

Figure 6 is a fragmentary side elevational view partially broken away showing the location and attachment of longitudinal leveling struts.

Figure 7 is a fragmentary cross-sectional view taken on the line 7—7 of Figure 6.

In an embodiment of the invention chosen for the purpose of illustration there is shown a chassis for a house trailer or mobile home which is very long in proportion to the width and which is suitable for trailers as long as sixty feet and longer. As shown the chassis comprises beams 10 and 11 extending throughout the entire length of the chassis, the beams in the chosen embodiment being supported upon a ground surface 12 by a pair of forward wheels 13 and 14 and a pair of aft wheels 15 and 16. The forward wheels are mounted upon customary axles and bearing supports, not shown. The spaced double wheel mounting is shown in view of the fact that the trailer is one which can be built of an exceptional length.

The beams 10 and 11 comprise channel sections each having a web 17 facing outwardly, an upper flange 18 and a lower flange 19. As best shown in Figures 1 and 2, converging extensions 20 of the channels are joined at the forwardmost end by a bracket 21 which mounts a trailer hitch 22.

To secure the beams of channel sections together there are provided a series of transversely extending longitudinally spaced lower cross members 23 and a corresponding number of similar upper cross members 24. The upper cross members for convenience are staggered in location with respect to the lower cross members 23. As suggested in Figure 5, the cross members may be attached to the upper flanges 18 of the channel sections by welding. It is further important to note that the cross members and especially the lower cross members are angle sections so positioned that edges 25 and 26 of legs 27 and 28 lie in engagement with the respective flanges and present the interior of the angle section as a long hollow space. This space in the case of the lower cross members is filled with a wood insert 29 having the same triangular cross-sectional shape as the cross member, the wood insert being slid into position lengthwise from the outside.

To provide a suitable fore and aft leveling means for the chassis a forward strut 30 and an aft strut 31 is provided on each side fastened to the web 17 of the respective beam by some convenient means such as welding. This relationship is shown in Figure 7 which illustrates the strut as extending a distance above the upper flange 18 almost as great as the breadth of the web of the channel section. The struts in the chosen embodiment are channel sections having flanges 33 and 34 and a web 35. At the upper ends the flanges are provided with recesses 32 which form a cradle at the top of each strut.

Near the fore end of each of the beams an anchor lug 36 is fastened to the web 17 adjacent the lower flange 19. The lugs are provided with suitable bores extending from end to end for reception of a truss rod 37 having a threaded end 38 extending through the lug to which a nut 39 is attached at the outer end. Similarly near the aft end of the chassis is a lug 40 receptive of the aft end of the truss rod which is likewise threaded for reception of the nut 41.

After the beam and cross member assembly has been mounted upon the wheels, the beams, and as a consequence the chassis, can be leveled in a horizontal direction by tightening up on the nut 39 and 41 an amount sufficient to lift the fore and aft ends of the chassis to a position level with the intermediate portion. The truss rods are made sufficiently heavy so that once the leveling has been accomplished, there will be no appreciable further sag at the ends after the trailer structure has been built upon the chassis.

The sub-floor structure is then ready to be laid upon the chassis. In this embodiment of the invention the sub-floor structure consists in the main of transverse floor joists 42 which are spaced on conventional sixteen-inch centers resting as shown upon the upper flanges 18 of the beams. In practice these floor joists are made from ten-foot lengths of standard floor joist lumber and cut so as to provide a permitted over-all breadth for the sub-floor structure. The lengths are such that there is an appreciable overhang or cantilever portion of each joist outside of the beams 10 and 11. In practice the ends of the floor joists are cut off evenly and have end plates 43 and 44 attached thereto at opposite ends. A sub-flooring 45 can then be attached to the upper surfaces of the floor joists and end plates.

In order to effectively anchor the floor joists to the beams 10 and 11, resort is had to lag screws 126 and washers 127 of large diameter sufficient that the lag screws can be driven into the underside of the floor joists adjacent the flanges 18 with the washer overlapping the flange, thereby to hold the joists down against the flange. Rocking of the floor joists is prevented by the end plates 43 and 44 previously described and if desired customary conventional cross bracing, not shown.

When these construction steps have been accomplished the trailer chassis and sub-floor structure combination has been completed to an extent ready for installation of the rough utility work. As shown in Figures 3 and 4 this utility work may consist in the main of water lines 48 and 49, a waste water or sewer line 50, and a heating pipe 51. These are suggested and shown by way of example and it is appreciated that other utility lines or wiring may be also employed. The important element in the structure with respect to the installation of these lines is that the beams, the cross members 23 and 24, and the floor joints form a chamber 52 which is continuous and uninterrupted throughout the entire length of the chassis so that complete lengths of the lines can be inserted therein without the necessity of cutting any portion of the chassis or sub-floor structure and without, if need be, making joints in the lines other than joining the sections prior to sliding them in place.

As shown to good advantage in Figure 4 the water lines 48 and 49 are merely secured against the lowermost edges of the floor joists by brackets 53. To fasten the waste water or sewer line, a strap 54 may be employed nailed to one face or the other of appropriate floor joists. The heating pipe 51 may be attached to the floor joists by similar conventional strap means 55.

As shown to good advantage in Figure 3, the water pipes 48 and 49 may extend upwardly in risers 56 and 57, the risers being brought upwardly between adjacent floor joists without any cutting of joists or other members being necessary. Similarly a riser 58 for the sewer line extending to a vent pipe 59 may also extend upwardly without any cutting being necessary. An intermediate riser 60 is similarly installed.

Where the heating pipe is to terminate in an outlet near the outer edge of the sub-floor structure, a branch pipe 61 can spring outwardly and upwardly from the main heater pipe 51 terminating in an outlet box 62 fastened appropriately to an adjacent floor joist and perhaps the plate 43. A junction box 63 is illustrated as mounted partially within the chamber 52 and extending upwardly alongside of a floor joist 42 at the top of which may be provided a suitable outlet.

Attention is specifically called to the location of these utility lines and facilities in order to demonstrate that they can be quickly and conveniently made in their entirety within the chamber 52 and extended upwardly through the sub-floor structure to appropriate locations without the necessity of cutting any of the structural members, thereby minimizing installation costs and minimizing the prospect of any weakening effect upon the structure after installation of such utilities.

Because of the construction shown and described insulating sheeting comprising sheets of asphalt coated fiberboard or other suitable sheet material may be applied last. To enclose the bottom of the chamber 52, sheets 64 are laid over the lower flanges 19 of the channel section in positions supported by the wood insert 29 contained within the lower angular cross members 23. Preferably these cross members are spaced uniform distances matched to the commercial lengths of sheeting so that the sheeting need not be cut. The sheeting is secured to the wood inserts by nails 65 which, once in place, are the only means needed to prevent the inserts from slipping out of position.

The outer end portions of the joists have sheets 66 and 67 applied to the underside and appropriately secured in place by nails 68. Although a portion of the sub-floor chassis need be left open for location of the wheels 13, 14, 15 and 16, suitable insulation may be applied to the top of the floor joists, thereby to enclose the entire sub-floor in an insulating fashion. Application of the sheets as just described in company with the closing effect of the webs 17 of the beams forms a continuous and complete closure for the underside of the sub-floor structure.

Further insulation as needed may take the form of flocculent bats 69 of glass fiber or other appropriate insulation wrapped around the piping where need be or stuffed against surfaces where they can be either packed in place or secured by other appropriate means customary in the trade. This material can all be applied from the top without obstruction by any of the structural members. Once the piping and insulating material has been installed, the sub-flooring 45 may be secured in place.

It is significant to note that should it become necessary at any time to either realign or replace the utility lines or to add extensions throughout the length of the trailer, it is necessary only to remove appropriate sheets 64, 66 or 67 to give ingress to the utility line and after replacement or the provision of extensions, replace the sheeting in the usual fashion. Further addition of extensions avoids the necessity of cutting structural members in the same fashion as when the lines are initially installed.

From the foregoing description of the construction of the device it will be clear that the parts when applied in a suitable order of construction as described permit trailer structures to be moved along an assembly line where entire units in a sub-assembly condition can be quickly placed in position and there anchored in readiness for the next step in construction.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures and devices.

I claim:

1. A foundation substructure for a house trailer comprising a chassis having a wheel and axle support mounted intermediate for and aft ends, and a floor structure mounted upon and carried by the chassis, said chassis comprising channel sections on opposite sides forming spaced parallel beams running from end to end between said wheels and above the axle, cross members anchored to upper and lower flanges, of said beams at longitudinally spaced locations, said members comprising angle sections having ends of legs thereof secured to the beam providing spaces therein of triangular cross-sectional shape, said cross-members and said beams forming between them a longitudinally continuous uninterrupted utility space throughout the length and breadth of the chassis, a plurality of longitudinally spaced floor joists extending transversely on the upper sides of said beams and extending beyond said beams and said wheels on both sides, means securing said joists to the upper flanges of said beams comprising washers and lag screws holding said washers against said upper flanges, end plates extending from end to end of the floor substructure secured to and covering outer ends of said floor joists, utility lines comprising piping and ducts located in said utility space and anchored to undersides of said joists and including lateral branches thereof lying intermediate said floor joists, ground side insulation comprising wood pieces of triangular cross-sectional shape lying in said cross-members, insulating sheet material overlying lower flanges of said beams and fastened on said wood pieces, said material providing a closed bottom for said utility space, and insulating sheet material secured to undersides of said joists at portions thereof outside said beams.

2. A foundation substructure for a house trailer comprising a chassis having a wheel and axle support mounted intermediate fore and aft ends, and a floor substructure mounted upon and carried by the chassis, said chassis comprising flanged sections forming spaced parallel beams running from end to end between said wheels and above the axle, cross members anchored to upper and lower sides of said beams at longitudinally spaced locations, said cross members on the lower sides of the beams comprising angle sections having ends of legs thereof secured to the beam providing spaces therein of triangular cross-sectional shape, said cross members forming with said beams a longitudinally continuous uninterrupted utility space throughout the length of the chassis, and ground side insulation for said chassis comprising wood pieces of triangular cross-sectional shape lying in said cross members on the lower sides of the beams, and overlying lower insulating sheet material overlying flanges of said beams and fastened on said wood pieces, said material providing a closed bottom for said utility space.

3. A foundation substructure for a house trailer comprising a chassis having a wheel and axle support mounted intermediate fore and aft ends, and a floor substructure mounted upon and carried by the chassis, said chassis comprising metal sections on opposite sides forming spaced parallel beams running from end to end between said wheels and above the axle, metal cross members anchored to upper and lower sides of said beams at longitudinally spaced locations, said cross members and said beams forming between them a longitudinally continuous uninterrupted utility space throughout the length of the chassis, a plurality of longitudinally spaced floor joists extending transversely on the upper sides of said beams and extending beyond said beams and said wheels on both sides, means securing said joists to the beams, end plates extending from end to end of the floor substructure secured to and covering outer ends of said joists, insulating sheet material overlying lower flanges of said beams providing a closed bottom for said utility space, insulating sheet material secured to undersides of said joists at portions thereof outside said beams, and longitudinal stiffening means for said chassis comprising a pair of fore and aft vertical struts on the outside of each beam adjacent the longitudinal mid-portion and extending to locations above the upper sides of said beams, means forming recesses in the upper ends of said struts, a tension truss rod on each side resting in said recesses, fore and aft anchor members on fore and aft ends of the beam on each side having means therein receptive of respective ends of the truss rods and tension adjusting nuts threaded on respective ends of the truss rods whereby to enable leveling of the chassis in a horizontal plane.

4. A foundation substructure for a house trailer comprising a chassis having a wheel and axle support mounted intermediate fore and aft ends, and a floor substructure mounted upon and carried by the chassis, said chassis comprising channel sections on opposite sides forming spaced parallel beams running from end to end between said wheels and above the axle, cross members anchored to upper and lower flanges of said beams at longitudinally spaced locations, said members comprising angle sections having ends of legs thereof secured to the beam providing spaces therein of triangular cross-sectional shape, said cross members and said beams forming between them a longitudinally continuous uninterrupted utility space throughout the length and breadth of the chassis, a plurality of longitudinally spaced floor joists extending transversely on the upper sides of said beams and extending beyond said beams and said wheels on both sides, means securing said joists to the upper flanges of said beams comprising washers and lag screws extending through said washers and into said joists holding said washers against said upper flanges, end plates extending from end to end of the floor substructure secured to and covering outer ends of said joists, utility lines comprising piping and ducts located in said utility space and anchored to under sides of said floor joists and including lateral branches thereof lying intermediate said floor joists, ground-side insulation comprising wood pieces of triangular cross-sectional shape lying in said cross members, insulating sheet material overlying lower flanges of said beams and fastened on said wood pieces, said material providing a closed bottom for said utility space, and insulating sheet material secured to under sides of said joists at portions thereof outside said beams, longitudinal stiffening means for said chassis comprising a pair of fore and aft vertical struts on the outside of each beam adjacent the longitudinal mid-portion and extending to locations above the upper sides of said beams, means forming recesses in the upper ends of said struts, a tension truss rod on each side resting in said recesses, fore and aft anchor members on fore and aft ends of the beam on each side having apertures therein receptive of respective ends of the truss rod and tension adjusting nuts threaded on respective ends of the truss rod whereby to enable leveling of said beams in a horizontal plane.

5. A foundation substructure for a house trailer comprising an elongate chassis having fore and aft ends and a wheel and axle support secured intermediate the chassis ends, the ends of the chassis being free of direct support from underneath said ends, two spaced and parallel beams disposed in a horizontal plane and running lengthwise of the chassis, a plurality of spaced apart cross-members secured to and interconnecting said beams, and longitudinal stiffening means for the chassis comprising strut means secured to and extending upwardly from the chassis intermediate the ends of the chassis, two truss rods, each beam having two rod fasteners secured thereto proximate opposite ends of the chassis, the ends of the rods being connected to the fasteners respectively, each rod extending from a fastener proximate one end of the chassis to a fastener proximate the other end of the chassis, the mid-portion of each rod being supported by the strut means and spaced upwardly from the beams, and the rods being taut thereby to provide upward support to the ends of the chassis.

6. A foundation substructure for a house trailer comprising an elongate chassis having fore and aft ends and a wheel and axle support secured intermediate the chassis ends, the ends of the chassis being free of direct support underneath said ends, two spaced and parallel beams disposed in a horizontal plane and running lengthwise of the chassis, a plurality of spaced apart cross-members secured to and interconnecting said beams, each beam having a strut secured to and extending upwardly therefrom intermediate the ends of the beam, a truss rod extending longitudinally of the beam and secured at its ends to the beam proximate the ends respectively of the beam, the truss rod being taut and extending from proximate one end of the beam to proximate the other end of the beam, the mid-portion of the rod being supported by said strut and spaced upwardly from the beam.

References Cited in the file of this patent

UNITED STATES PATENTS

| | | |
|---|---|---|
| 808,265 | Vogel | Dec. 26, 1905 |
| 978,785 | Schlie | Dec. 13, 1910 |
| 1,359,906 | Moore | Nov. 23, 1920 |
| 1,453,954 | Scholtes | May 1, 1923 |
| 2,587,871 | May et al. | Mar. 4, 1952 |
| 2,743,955 | Willson | May 1, 1956 |
| 2,851,281 | Felburn | Sept. 9, 1958 |

FOREIGN PATENTS

| | | |
|---|---|---|
| 364,179 | France | May 25, 1906 |